(12) United States Patent
Zhang et al.

(10) Patent No.: US 8,881,241 B2
(45) Date of Patent: Nov. 4, 2014

(54) METHOD OF AND SYSTEM FOR IMPLEMENTING PRIVACY CONTROL

(75) Inventors: Fengpei Zhang, Guangodng (CN); Stico Ouyang, Guangdong (CN); Zhou Wu, Guangdong (CN); Benson Peng, Guangdong (CN)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 404 days.

(21) Appl. No.: 13/148,223

(22) PCT Filed: Feb. 13, 2009

(86) PCT No.: PCT/CN2009/000151
§ 371 (c)(1),
(2), (4) Date: Oct. 5, 2011

(87) PCT Pub. No.: WO2010/091534
PCT Pub. Date: Aug. 19, 2010

(65) Prior Publication Data
US 2012/0137347 A1    May 31, 2012

(51) Int. Cl.
*H04L 29/00* (2006.01)
*H04L 29/06* (2006.01)
*H04W 4/20* (2009.01)
*H04L 29/08* (2006.01)
*H04W 4/02* (2009.01)

(52) U.S. Cl.
CPC .............. *H04L 63/08* (2013.01); *H04L 63/107* (2013.01); *H04W 4/20* (2013.01); *H04L 67/18* (2013.01); *H04W 4/02* (2013.01)
USPC .......................................................... 726/4

(58) Field of Classification Search
USPC ........................................................ 726/5, 6
See application file for complete search history.

(56) References Cited

U.S. PATENT DOCUMENTS

| 6,192,474 | B1 | 2/2001 | Patel et al. | |
| 2008/0263645 | A1 * | 10/2008 | Renter et al. | 726/6 |

FOREIGN PATENT DOCUMENTS

| CN | 101026869 A | 8/2007 |
| CN | 101110989 A | 1/2008 |
| CN | 101217374 A | 7/2008 |
| CN | 101291217 A | 10/2008 |
| JP | 2004242058 A | 8/2004 |

(Continued)

OTHER PUBLICATIONS

Nabil Ajam/ Privacy Based Access to Parlay X Location Services/ 2008/pp. 204-209.*

(Continued)

*Primary Examiner* — Brandon Hoffman
*Assistant Examiner* — Michael D Anderson
(74) *Attorney, Agent, or Firm* — Coats and Bennett, PLLC (57) ABSTRACT

A method and a system for implementing privacy control in a communication network are provided. The method comprises the steps of generating a first Request Verification Code (RVC) for each user request in a privacy server by means of parameter hashing or non-Parameter-hashing and forwarding the user request together with the first RVC to the SP; and verifying a second RVC and user privacy setting (s) in a privacy server, wherein the second RVC is received together with a further request from the SP. The system comprises an untrustworthy subsystem comprising at least one Service Provider (SP) for providing application service and a trustworthy subsystem comprising at least one mobile operator module for providing communication service, wherein the mobile operator module further comprises at least one mobile core network for providing user privacy control by means of Request Verification Code (RVC). According to the method and system of the invention, security and privacy control in a communications network has been greatly improved.

41 Claims, 4 Drawing Sheets

(56) References Cited

FOREIGN PATENT DOCUMENTS

| JP | 2005234882 A | 9/2005 |
|----|--------------|--------|
| JP | 2008048166 A | 2/2008 |
| JP | 2008148354 A | 6/2008 |

OTHER PUBLICATIONS

Nabil Ajam, Ahmed Bouabdallah/ Managing Privacy in Operator Networks for NGN services/2008/pp. 1-4.*

3rd Generation Partnership Project. 3GPP TS 23.271, V8.0.0 (Dec. 2008). 3rd Generation Partnership Project; Technical Specification Group Services and System Aspects; Function stage 2 description of Location Services (LCS) (Release 8). Dec. 2008.

3rd Generation Partnership Project. 3GPP TR 23.871, V5.0.0 (Jul. 2002). 3rd Generation Partnership Project; Technical Specification Group Services and System Aspects; Technical Report enhanced support for User Privacy in location services (Release 5). Jul. 2002.

* cited by examiner

METHOD OF AND SYSTEM FOR IMPLEMENTING PRIVACY CONTROL

TECHNICAL FIELD

The present invention relates generally to a method and system for verification of user entities in a communications network. In particular, the invention concerns improved privacy control of a communication network.

BACKGROUND

As the development of the communication technology, user can experience multifarious network service. One illustrative example thereof is the location-based service. Location-based service is an information and entertainment service, accessible with mobile devices through the mobile network and utilizing the ability to make use of the geographical position of the mobile device. Mobile operators can provide this kind of service by locating end user's mobile device in their mobile network. Location-based service could provide much convenience, for instance, for the following scenario: a friend (User A) is willing to have lunch with you (User B) if you happen to be nearby. To find out your exact location, the friend needs to access your location information provided by your mobile operator. Apart from that, the friend might also be interested in finding out the restaurants nearby. In this case, the information resources to which your friend would like to access include your location information and the location information of the restaurant. Your location information and the location information of the restaurant are exposed to the friend.

It is true that exposing locating and/or tracking capabilities to SP (Service Provider) can encourage lots of fancy location-based applications, such as finding the nearest hospital, getting the position of a friend, tracking a vehicle and even playing location-based games. However, since location information is sensitive and private, any disallowed access should be avoided. Mobile operators must assure the privacy protection and play important role when the location interface is exposed to service providers.

Unfortunately, current methods make it relatively easy to identify a particular user with specific data about the user, thus raising privacy concerns. Current standards and solutions such as Parlay-X and MLP, cannot provide strong support in privacy protection. Typically, a SP could launch a forgery attack even when a user has privacy settings in operator side. For example, SP can modify the "requestor" field of the request to bypass privacy settings. Following example shows this kind of attack:

Considering following privacy setting of userA:
UserB locate userA—Forbidden
UserC locate userA—Allow In current existing standards and/or solutions, SP could help userB to launch a forgery attack when userB tries to locate userA, by modifying the "requestor" field to "userC" to successfully locate userA.

There are solutions like using user alias or encrypted address to avoid SP getting user's real identity (like MSISDN), but they all have restrictions or impact on the SP applications while some SP applications may need the real user identity to complete the service after all.

Accordingly, it would be desirable to provide a method of and a system for implementing privacy control in a communication network to overcome the above disadvantages.

SUMMARY

Therefore, it is an object of the present invention to address the above disadvantages by providing a method of and a system for implementing privacy control in a communication network to improve network security.

According to one aspect of the invention, there is provided a method of implementing privacy control in a communication network comprising at least one privacy server and at least one Service Provider (SP). The method comprises generating a first Request Verification Code (RVC) for each user request in the privacy server by means of parameter hashing or non-Parameter-hashing and forwarding the user request together with the first RVC to the SP; and verifying a second RVC and user privacy setting (s) in the privacy server, wherein the second RVC is received together with a further request from the SP.

In an embodiment of the method, the privacy server stores the first RVC prior to forwarding the request and verifying a second RVC to be identical to the stored first RVC.

In an embodiment of the method, in case the non-parameter hashing is performed, parameters related to the user request (comprising at least "requestor") is stored in the privacy server for further verification as there is no verification information included in the RVC. When the second RVC comes from the SP, the parameters together with the second RVC are checked by the privacy server to judge whether they are unmodified.

In an embodiment of the method, in case the parameter hashing is performed, the privacy server should store the first RVC and the privacy server should already know the parameters, on which the first RVC is based (the RVC at least should be on the basis of "requestor"), and therefore it is unnecessary to store parameters. When the second RVC comes, the privacy server generates a new RVC on the basis of the parameters contained in the further request from the SP, and judges whether the new RVC is equivalent to the second RVC from the SP. This new RVC should be equivalent to the second RVC from the SP, and also equivalent to the first RVC already stored in the storage.

In an embodiment of the method, verifying a second RVC and user privacy setting further comprises checking whether the second RVC is equivalent to the first RVC; and verifying whether the user initiating the user request is allowed under user privacy setting of the user being requested.

Preferably, in the parameter hashing the first RVC is generated on the basis of parameters of the user request, and in the non-parameter hashing the first RVC is a unique ID independent on parameters of the user request.

In an embodiment of the method, the method further comprises executing business logic in the SP after the SP receives the user request with the first RVC; forwarding the location request from the SP to a Parlay-X Gateway; and invoking a request from the Parlay-X Gateway to the privacy server so as to verify the further request.

In an embodiment of the method, the method further comprises forwarding the requested information from Mobile Positioning System (MPS) to the Parlay-X Gateway after the second RVC and user privacy setting are verified, and exposing the requested information in the SP.

Preferably, the further request forwarded to the Parlay-X Gateway includes a "requestor" indicating the user who initiates the user request, and an address to be located that indicates another user who is being requested.

Preferably, the user request is initiated by means of Short Message Service (SMS) and/or Multimedia Message Service (MMS).

Preferably, the user request is initiated by means of Wireless Application Protocol (WAP) access.

Preferably, the user request is initiated by means of Web access.

In an embodiment of the method, the user request is intercepted by the Parlay-X Gateway and Short Message Service Centre (SMSC) and/or Multimedia Message Service Centre (MMSC), and preferably, the Parlay-X Gateway judges whether the user request comprises the further request after intercepting the user request, and requesting the privacy server to generate a RVC if the user request comprises the further request.

In an embodiment of the method, the user request is intercepted by a SP WAP portal, and preferably, the first RVC is generated on the basis of the determination that the user request comprises the further request.

In an embodiment of the method, the user request is intercepted by a SP WEB portal, and preferably, the user initiating the user request is required to login if the user request comprises a further request; and the first RVC is generated on the basis of the verification of the user ID and password.

According to another aspect of the invention, there is provided a communication system for providing privacy control. The communication system comprises untrustworthy subsystem comprising at least one Service Provider (SP) for providing application service and trustworthy subsystem comprising at least one mobile operator module for providing communication service, wherein the mobile operator module further comprises at least one mobile core network for providing user privacy control by means of Request Verification Code (RVC).

In an embodiment of the communication system, the mobile operator module further comprises Mobile Positioning (MPS) for locating the position of mobile users.

In an embodiment of the communication system, the mobile core network includes at least one Parlay-X Gateway and at least one privacy server coupled with the Parlay-X Gateway. The privacy server associating with the Parlay-X Gateway is configured to generate a first RVC for each user request by means of parameter hashing or non-Parameter-hashing, and to verify a second RVC and user privacy setting. The Parlay-X Gateway is coupled to the SP for receiving a further request and the second RVC from the SP or sending requested information to the SP, or exposing the requested information to the SP, and the Parlay-X Gateway is further coupled to the MPS for sending further request to the MPS and receiving requested information from the MPS.

In an embodiment of the method, in case the non-parameter hashing is performed, parameters related to the user request (comprising at least "requestor") is stored in the privacy server for further verification as there is no verification information included in the RVC. When the second RVC comes from the SP, the privacy server is needed to check whether both the second RVC and parameters are unmodified.

In an embodiment of the method, in case the parameter hashing is performed, the privacy server should store the first RVC and the privacy server should also know on what parameters the RVC is based (at least should be based on "requestor"), and therefore storing parameter is not necessary. When the second RVC comes, the privacy server generates a new RVC on the basis of the parameters in the further request from the SP, and judges whether the new RVC is equivalent to the second RVC from the SP. This new RVC should be equivalent to the second RVC from the SP, and also equivalent to the first RVC already stored in the storage.

Preferably, in the parameter hashing the first RVC is generated on the basis of parameters of the user request according to mathematic algorithm, and in the non-parameter hashing the first RVC is a unique ID independent on parameters of the user request.

In an embodiment of the communication system, the mobile operator module further includes SMSC and/or MMSC associated with the mobile core network to send and receive SMS and/or MMS.

In an embodiment of the communication system, the Parlay-X Gateway is associated with the SMSC and/or MMSC to intercept SMS and/or MMS and the Parlay-X Gateway is further associated with the privacy server to invoke a request to the privacy server to verify the further request on the basis of the determination that the SMS and/or MMS comprises a further request.

In an embodiment of the communication system, the privacy server is configured to check whether the second RVC is equivalent to the first RVC so as to provide the verification of the second RVC, and the privacy server is further configured to judge whether the user initiating the user request is allowed under the user privacy setting.

In an embodiment of the communication system, the SP further includes a SP Web Portal associated with the privacy server, wherein the privacy server is configured to request the user to login if the user request comprises a further request, and to generate the first RVC on the basis of the verification of the user ID and password.

In an embodiment of the communication system, the SP further includes a SP Wireless Application Protocol (WAP) Portal associated with the privacy server, wherein the privacy server is configured to generate the first RVC on the basis of the determination that the user request comprises a further request.

According to yet another aspect of the invention, there is provided an apparatus for implementing privacy protection in a communications network, the apparatus comprising: means for generating a first Request Verification Code (RVC) for each user request; means for locating the position of mobile users; means for verifying a second RVC and user privacy setting; means for exposing requested information in response to said verifying.

According to yet another aspect of the invention, there is provided a machine-readable medium, storing instructions, which when executed perform the aforesaid method.

According to yet another aspect of the invention, there is provided a data structure for storage of Request Verification Code (RVC) and related privacy control data, such as parameters, time stamp of generating, single or multiple usage allowed, usage counter, etc. This data structure is preferably maintained in a privacy server.

The method and system according to the present invention is easy to implement on the basis of the existing Parlay-X Gateway and Privacy Server architecture with simple improvement in Parlay-X specification and integration with SP application. Furthermore, there is no impact on end user experience for SMS and WAP usage and little impact on end user experience in WEB access. From SP application development perspective, unlike some solutions that use a user alias to prevent SP applications to know the user's MSISDN or similar real user identity, the solution according to the invention doesn't prevent a SP application to retrieve the MSISDN and this keeps the flexibility in developing SP applications.

BRIEF DESCRIPTION OF THE DRAWINGS

The above and other aspects, features and advantages of the present invention will be more apparent from the following more particular description thereof, presented in conjunction with the accompanying drawings, in which.

Corresponding reference characters indicate corresponding components throughout the several views of the drawings.

DETAILED DESCRIPTION

The embodiments set forth below represent the necessary information to enable those skilled in the art to practice the invention and illustrate the best mode of the practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

Throughout the description and claims of this specification, the terminology "SP" includes, but is not limited to, a service provider; term "SMS" includes but is not limited to short message service; term "MMS" includes but is not limited to multimedia service; term "SMSC" includes but is not limited to Short Message Service Center; term "MMSC" includes but is not limited to Multi-Media Service Center; term "SMPP" includes but is not limited to Short Message Peer to Peer; term "MLP" includes but is not limited to Mobile Location Protocol; term "MPS" includes but is not limited to Mobile Positioning System; term "WAP" includes but is not limited to Wireless Application Protocol; and "RVC" includes but is not limited to Request Verification Code.

Figure 1:
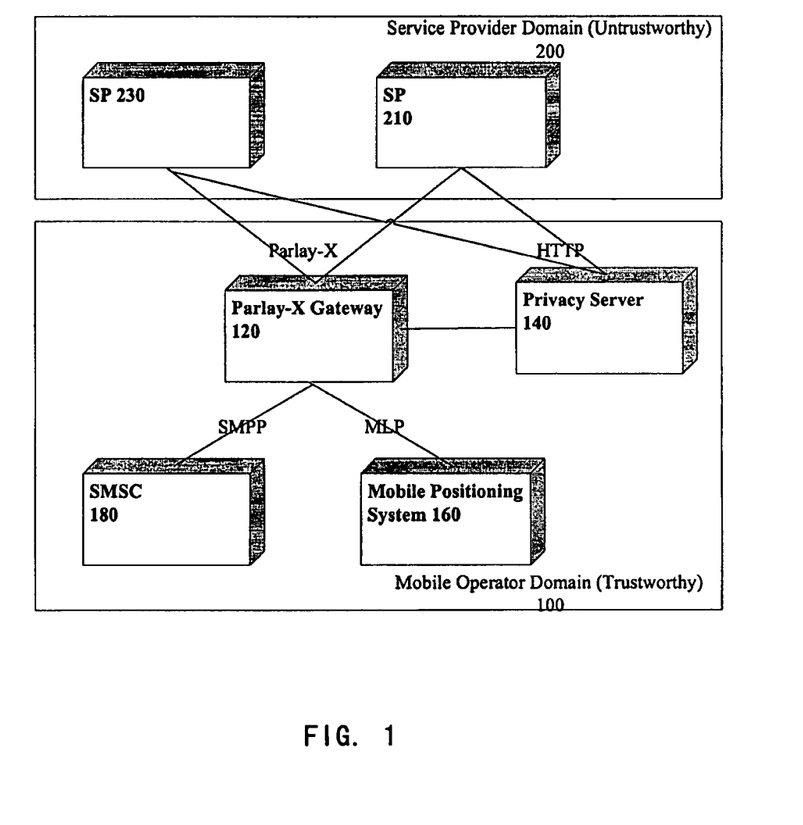
FIG. 1 is a simplified block diagram illustrating a communication network that may implement privacy control.

FIG. 1 is a schematic block diagram of a communication system in which one embodiment of the present invention is implemented. As is shown, the communication system comprises two subsystems, trustworthy system 100 and untrustworthy system 200. In the present embodiment, trustworthy subsystem 100 refers to the mobile operator domain and further comprises Parlay-X Gateway 120, Privacy Server 140, MPS 160 and SMSC 180. Untrustworthy subsystem 200 comprises SP 210 and SP 230 for providing application services such as SP WAP application and SP Web application. In the mobile operator domain, Parlay-X Gateway 120 is connected to SMSC 180 to send and receive SMS and/or MMS, and further connected to MPS 160 to locate the mobile user. Furthermore, Parlay-X Gateway 120 is used to expose a unified interface towards SPs 210 and 230. MPS 160 can be used to locate the position of mobile user by means of the mobile network. SMSC 180 is connected to Parlay-X Gateway 120 for sending and receiving SMS messages. SMSC 180 can also be replaced by a MMSC for providing MMS. On the other hand, SPs 210 and 230 are used to provide application services by means of SP Applications. Example of such a SP application is a User Presence Service.

Those skilled in the art will be familiar with the architecture shown in FIG. 1 without Privacy Server 140. These portions are therefore described herein only to the extent necessary to provide an understanding of the embodiments of the present application. However, when on the other hand, the architecture shown in FIG. 1 includes Privacy Sever 140, the performance and capability of the architecture has been significantly improved.

Privacy server 140 is coupled to Parlay-X Gateway 120 and is associated with SPs 210 and 230.

Firstly Privacy Server 140 can be used to store user privacy settings. An example of user privacy settings can be an "allowed list" for location information. For example, User A can set User B and User C in "Allowed List" in Privacy Server 140 so that User B and User C can locate User A when needed. Anyone who does not exist in the list cannot locate User A.

Secondly, Privacy Server 140 plays an important role in the embodiments of the present invention, by generating and verifying a unique code named Request Verification Code (RVC). To be specific, RVC is generated for each user request by means of parameter hashing or non-Parameter-hashing.

As for the parameter hashing, the RVC is generated on the basis of parameters of the user request according to a mathematical algorithm, such as MD5. This code generation is generally known as "hashing". For example, if User A files a request to locate User B by channel SMS, the privacy server will generate a RVC on the basis of the contents of this user request. The information used for hashing does not necessarily need to be the whole request but may be limited to specific elements (parameters) like MSISDN of User A, Request Timestamp, etc. To verify integrity of the request later on, hashing is done again and should give the same code as before.

As for the non-parameter hashing, the RVC is a unique ID, which is independent on parameters of the user request. Verification in this case means that specific parameters must be stored with the ID and later these are compared with the parameters in the request.

The above is only a brief introduction regarding RVC, more detailed description will be given below in conjunction with FIGS. 2, 3 and 4. It should be understood that one or more Parlay-X Gateway 120, Privacy Server 140, MPS 160 and SMSC 180 as well as SPs 210 and 230 may comprise hardware, software, or any combination thereof. In at least one embodiment, these portions include instructions to carry out operations corresponding to the method steps as discussed below. Such instructions may be embodied as one or more computer programs comprising stored program instructions in a storage element (e.g., memory).

Figure 2:
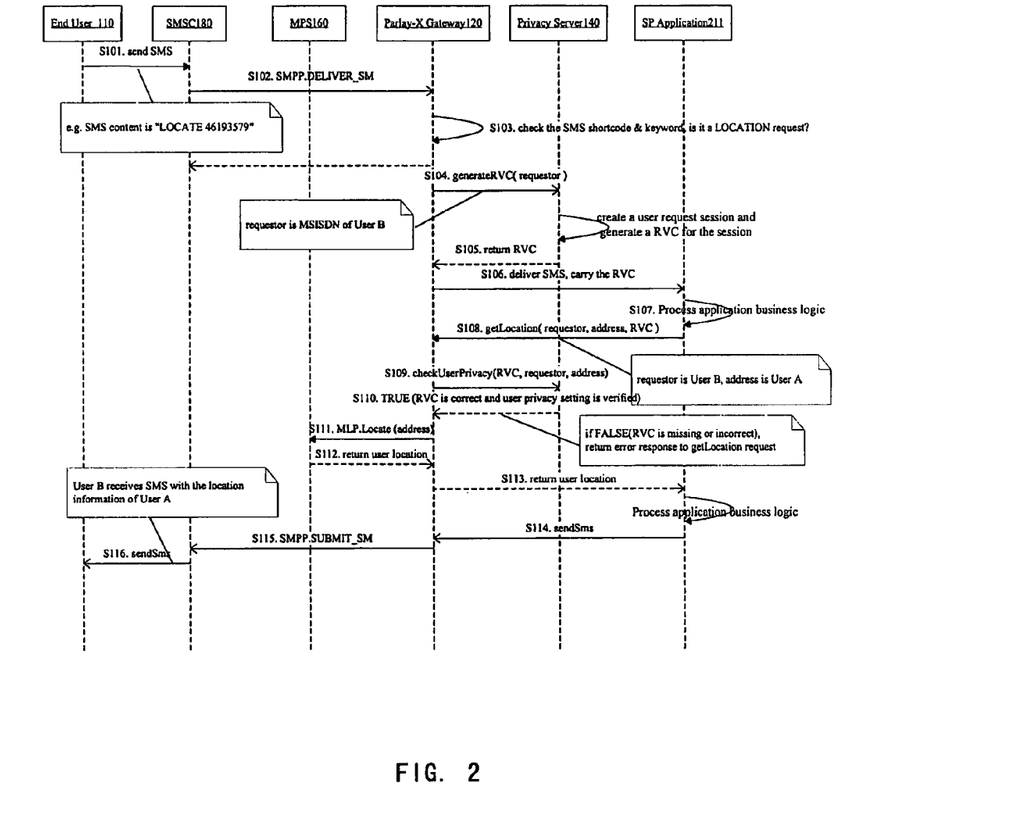
FIG. 2 represents an exemplary message flow that illustrates an embodiment having implemented privacy control in a scenario with SMS access.

Referring now to FIG. 2, there is shown a flow chart illustrating a method of location privacy protection in a communication network in accordance with an embodiment of the present invention. It should be understood that the method is not necessarily limited to the illustrated sequence, some steps may be omitted as desired, and some steps may be performed together or otherwise in an interrelated fashion.

In this scenario, the user initiates the user request by SMS. Application 211 is upfront created, has connection to parlay X gateway 120 and is in some form registered there. The key information is part of the "registration". Application 211 is known by Parlay-X Gateway 120 with the following key information: this is a SMS application; this is a Location based application; there is a Flag to indicate whether to intercept this SMS application or not and there is SMS Keyword for interception such as "LOCATE". The mobile operator needs to check and approve this information.

The method begins with step S101 in which End User B 110 sends a SMS to locate User A. For example, the SMS content may be "LOCATE 46193579 H. The contents of the SMS identifies that location shall be done for user A. SMSC180 immediately receives the SMS and further forwards this SMS to Parlay-X Gateway 120 according to SMPP in step S101. It should be noted that the term "SMPPH is used as outlined in the introduction. Instead of actual SMPP comparable protocols like UCP and MM7 can be used. After receiving the SMS, in step S103 Parlay-X Gateway 120 checks the SM8 content and judges whether it's a location-based service request by comparing the 8M8 keyword. If there is location request, then Parlay-X Gateway 120 sends a request to Privacy server 140 to get a RVC with the MSISDN of User B 110, as shown in step S104, otherwise the flow goes to step S106. When receiving the request from Parlay-X Gateway 120, Privacy Server 140 generates a first RVC on the basis of the user request from User B 110 and then returns the first RVC to Parlay-X Gateway 120, as illustrated in step S105.

After that, in step S106, the SMS carrying the first RVC will be forwarded to Application 211 by Parlay-X Gateway 120. To illustrate how a SMS carries a RVC, a brief description of Parlay-X SMS will be introduced herein.

As shown herewith, in Parlay X Short Messaging specification, operation notifySmsReception is used by Parlay X Gateway 120 to forward SMS to SP 210 (Application 211). The definition of notifySmsReception is illustrated as shown in Tables 1 to 3 for a brief view.

TABLE 1

| Part name | Part type | Optional | Description |
|---|---|---|---|
| correlator | xsd:string | No | Correlator provided in request to set up this notification |
| message | SmsMessage | No | Message received |

TABLE 2

| Element name | Element type | Optional | Description |
|---|---|---|---|
| message | xsd:string | No | Text received in SMS |
| senderAddress | xsd:anyURI | No | It indicates address sending the SMS |

TABLE 2-continued

| Element name | Element type | Optional | Description |
|---|---|---|---|
| smsService-Activation-Number | xsd:anyURI | No | Number associated with the invoked Message service, i.e. the destination address used to send the message |
| dateTime | xsd:dateTime | Yes | Time when message was received by operator |

TABLE 3

| Part name | Part type | Optional | Description |
|---|---|---|---|
| None | | | |

Table 1 provides the definition of the input message: notifySmsReceptionRequest; Table 2 provides the SmsMessage structure and Table 3 defines the output message: notifySmsReceptionResponse.

To carry RVC in this message, following ways are provided: encoding RVC with senderAddress in SmsMessage; or extending SmsMessage to contain RVC; or adding RVC in the SOAP header.

Turning to step S107, after receiving the SMS carrying a first RVC, SP application processes the SMS and executes the business logic to, for example, find the information which User B 110 is interested in. In the present embodiment, User B 110 is interested in the location information of User A. Therefore SP application will send the location request to Parlay-X Gateway 120 to locate User A in step S108.

The instruction employed here is getLocation (Requestor, address, RVC), wherein the input parameter adopts User B as "requestor", User A as address to be located, and the RVC is the second RVC, which comes from SP application.

For clarity, term "getLocation" is specified for a brief introduction. In Parlay X Terminal Location specification, operation getLocation is used by the application of request Parlay X Gateway for terminal location. The definition of getLocation is illustrated as below:

TABLE 4

| Part name | Part type | Optional | Description |
|---|---|---|---|
| requester | xsd:anyURI | Yes | It identifies the entity that is requesting the information. The application invokes this operation on behalf of this entity. However, it should NOT be assumed that the application has authenticated the requestor. If this part is not present, the requesting entity is the application itself. |
| address | xsd:anyURI | No | Address of the terminal device for which the location information is requested |
| requestedAccuracy | xsd:int | No | Accuracy of location information requested |
| acceptableAccuracy | xsd:int | No | Accuracy that is acceptable for a response |
| maximumAge | common:TimeMetric | Yes | Maximum acceptable age of the location information that is returned |
| responseTime | common:TimeMetric | Yes | Indicates the maximum time that the application can accept to wait for a response |
| tolerance | DelayTolerance | No | Indicates the priority of response time versus accuracy |

TABLE 5

| Part name | Part type | Optional | Description |
|---|---|---|---|
| result | LocationInfo | No | Location of the terminal for which location information was requested |

Table 4 defines the format of input message and Table 5 provides the definition of output message. To carry RVC in this message, there are three possible ways: Encode RVC with requestor; Extend this message to contain RVC; Add RVC in the SOAP header. Furthermore, the same scheme can be applied to other operations like: getTerminalDistance; getLocationForGroup; startGeographicalNotification; and startPeriodicNotification.

Turning to Step S109, Parlay-X Gateway 120 files a request to Privacy Server 140 to verify the second RVC. Similarly, the input parameters include requestor (User B), address to be located (User A), and the second RVC. Then in step S110, Privacy Server 140 checks whether the second RVC is the correct one from the SMS request from User B 110. In other words, Privacy Server 140 checks whether the second RVC is the same as the first RVC. Furthermore, Privacy Server 140 also checks whether User B 110 is in the allowed list of User A. Then Privacy Server 140 will respond to Parlay-X Gateway 120 and thereafter Parlay-X Gateway 120 will check the response from Privacy Server 140. If it is "TRUE", that is, the RVC is correct and the user privacy setting is verified, then Parlay-X Gateway 120 sends location request to MPS 160 in form of "MLP.Locate (address)", which is shown in step S111. Otherwise, if the second RVC is not equivalent to the first one, that is, the RVC is destroyed or missing, then Parlay-X Gateway 120 sends failure response to SP application. Following that, in step S112, MPS 160 finds out the location information of User A and returns it to Parlay-X Gateway 120. Parlay-X Gateway 120 forwards the location of User A to SP Application 211 in step S113. After that, in step S114, SP Application 211 sends the location information or service information on the basis of the location information of User A to Parlay-X Gateway 120 by SMS. At last Parlay-X Gateway 120 sends the SMS to SMSC 180 and SMSC 180 further forwards the SMS to User B 110 as shown in steps S115 and S216. According to the steps described above, User B 110 finally receives the location information of User A by mean of SMS.

In the above embodiment, the lifetime of RVC can depend on an expiration time and maximum times. Expiration time means one RVC can be used in certain period after it's created. For example, it can be used in 2 hours. Maximum Times means one RVC can be used in one or multiple times. Both parameters can be configured in the Parlay-X Gateway and the privacy server can generate appropriate RVC according to these parameters.

Another embodiment according to one aspect of the invention, illustrates a scenario in which User B 110 can also receive the location of user A by means of WAP access. In this scenario SP location WAP URL is configured by Privacy Server 140.

Figure 3:
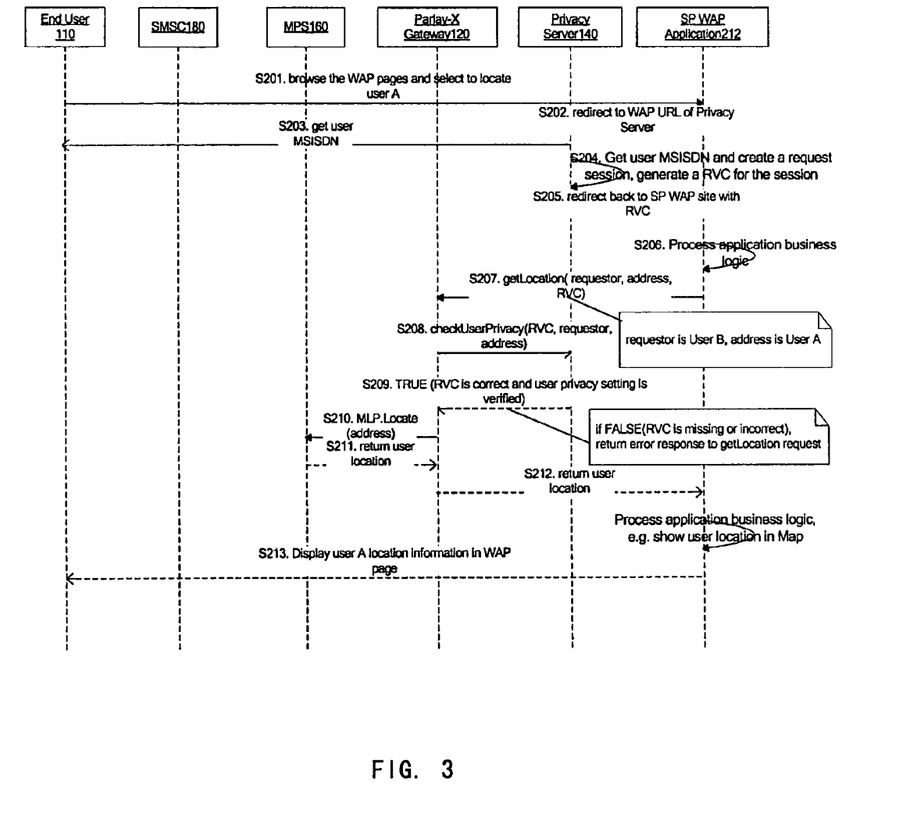
FIG. 3 represents an exemplary message flow that illustrates an embodiment having implemented privacy control in a scenario with WAP access.

In this embodiment, as shown in FIG. 3, firstly User B 110 enters the SP WAP Portal and browses the WAP pages to select and to locate User A. Then in step S202, SP WAP Portal redirects to WAP URL of Privacy Server 140. Privacy Server 140 verifies the URL from SP WAP Portal to assure that it's the URL for location, and retrieves User MSISDN from the browser of mobile terminal in step S203.

In the following step S204, Privacy Server 140 obtains the user MSISDN and creates a request session. Furthermore, Privacy Server 140 generates a first RVC for the session. In step S205, Privacy Server 140 redirects back to SP WAP Portal with the first RVC. In step S206, SP WAP Application 212 executes the business logic. In step S207, SP WAP Application 212 sends the location request to Parlay-X Gateway 120 to locate User A; the input parameters include User B as requestor, User A as address to be located, and the RVC. In step S208, Parlay-XGateway 120 invokes a request to Privacy Server 140 to verify the RVC, wherein the input parameters include requestor as User B, address to be located as User A, and a second RVC. Then in step S209, Privacy Server 140 checks whether the second RVC is the correct one in the WAP request from User B 110. In other words, Privacy Server 140 checks whether the second RVC is the same as the first RVC. Furthermore, Privacy Server 140 also checks whether User B 110 is in the allowed list of User A. Then Privacy Server 140 will respond to Parlay-X Gateway 120 and thereafter Parlay-X Gateway 120 will check the response from Privacy Server 140. If it is "TRUE", that is, the RVC is correct and the user privacy set ting is verified, then Parlay-X Gateway 120 sends location request to MPS 160 in form of "MLP.Locate (address)", which is shown in step S210. If the second RVC is not equivalent to the first one, that is, the RVC is destroyed or missing, then Parlay-X Gateway 120 sends a failure response to SP application. In case the RVC is correct and the user privacy setting is verified, then MPS 160 returns location of User A to Parlay-X Gateway 120, as shown in step S211. Finally, in steps S212 and S213, Parlay-X Gateway 120 returns location of User A to SP WAP Application 212 and SP WAP Application 212 shows Location information or service information on the basis of it of User A in WAP Portal to User B 110. According to the steps described above, User B 110 finally obtains the location information of User A by mean of WAP access.

Another alternative embodiment according to one aspect of the invention illustrates a scenario in which User B 110 try to obtain the location information of user A by means of Web access. In this scenario SP location Web URL is configured by Privacy Server 140 and furthermore User B 110 should register in Web Portal of Privacy Server 140.

In this embodiment, the message flow of the method differs from the previous embodiment, which is implemented in WAP access, mainly in steps S301 to S306. To be specific, at first, similarly, User B 110 enters the SP Web Portal, and browses the Web pages to select and to locate User A. Then in step S302, SP Web Portal redirects to Web URL of Privacy Server 140. Privacy Server 140 verifies the URL from SP Web Portal to assure that it's the URL for location, and then requests User B 110 to login in step S303. In step S304, User B 110 should login with his and/or her user ID (MSISON) and password. After the user ID and password are successfully verified, Privacy Server 140 creates a request session in step S305. Furthermore, Privacy Server 140 generates a first RVC for the session. In step S306, Privacy Server 140 redirects back to SP Web Portal with the first RVC.

The following steps are similar to those described in the previous embodiment. In step S307, SP Web Application 213 executes the business logic. In step S308, SP Web Application 213 sends the location request to Parlay-X Gateway 120 to locate User A; the input parameters include User B as requestor, User A as address to be located, and the RVC. In step S309, Parlay-X Gateway 120 invokes a request to privacy server to verify the RVC, wherein the input parameters include requestor as User B, address to be located as User A, and a second RVC. Then in step S310, Privacy Server 140 checks whether the second RVC is the correct one in the Web request from User B 110. In other words, Privacy Server 140 checks whether the second RVC is the same as the first RVC. Furthermore, Privacy Server 140 also checks whether User B 110 is in the allowed list of User A. Then Privacy Server 140 will respond to Parlay-X Gateway 120 and thereafter Parlay-X Gateway 120 will check the response from Privacy Server 140. If it is "TRUE", that is, the RVC is correct and the user privacy setting is verified, then Parlay-X Gateway 120 sends location request to MPS 160 in form of "MLP.Locate (address)", which is shown in step S311. If the second RVC is not equivalent to the first one, that is, the RVC is destroyed or missing, then Parlay-X Gateway 120 sends failure response to SP application. In case the RVC is correct and the user privacy setting is verified, then MPS 160 returns location of User A to Parlay-X Gateway 120, as shown in step S311. Finally, in steps S313 and S314, Parlay-X Gateway 120 returns location of User A to SP Web Application 213 and SP Web Application 213 shows location information or service information of User A in Web Portal to User B 110. According to the steps described above, User B 110 finally obtains the location information of User A by mean of Web access.

As a result, the security performance of the communication network is greatly improved. The method illustrated in FIGS. 2 to 3 applies not only to a mobile wireless network, but also to wired network, or a communication network on the basis of the combination of wireless and wired network.

For the sake of clarity, the applied channel-type for request and response, as presented in the embodiments, has been kept the same. In practice these can be different, like a web based request with SMS or MMS based response, without departing from the core of the invention.

It should also be understood that the embodiments are described on the basis of just one example of privacy control; location information and an "allowed list". The core of the invention, being the control on the integrity of requests, can however be applied in enforcements of all kind of policies not limited to privacy or access policies Throughout the description and the claims of this specification, the words "comprise", "include", and variations of the words, for example "comprising" and "comprises", mean "including but not limited to", and are not intended to (and do not) exclude other components, integers or steps.

Throughout the description and the claims of this specification, the singular encompasses the plural unless the context otherwise requires. In particular, where the indefinite article is used, the specification is to be understood as contemplating plurality as well as singularity, unless the context requires otherwise.

It should be understood that the foregoing description of the embodiments of the invention has been presented for purposes of illustration and description. This description is not exhaustive and does not limit the claimed invention to the precise forms disclosed. Modifications and variations are possible in light of the above description or may be acquired from practicing the invention. The claims and their equivalents define the scope of the invention.

The invention claimed is:

1. A method implemented by at least one privacy server for privacy control in a communication network, wherein the communication network includes a trusted subsystem and an untrusted subsystem, wherein the trusted subsystem includes the at least one privacy server and the untrusted subsystem includes at least one Service Provider (SP), wherein the method comprises: generating a Request Verification Code (RVC) for each user request that is to be sent from the trusted subsystem to an SP in the untrusted subsystem, wherein an RVC is generated for a user request by performing parameter hashing or non-Parameter-hashing with respect to that user request and is to be sent to the SP along with the user request, wherein parameter hashing is a hashing algorithm applied on at least one parameter included in the user request and wherein a non-parameter hashing is a hashing algorithm that utilizes a unique identifier independent of the user request; and for each request that is received at the trusted subsystem from an SP in the untrusted subsystem and that implicates privacy settings of a user, verifying the integrity of that received request based on an RVC received together with the request and verifying whether the privacy settings of the user allow the request.

2. The method according to claim 1, further comprising storing the RVC generated for each user request and wherein verifying the integrity of a received request comprises verifying that the RVC received together with that request is identical to the RVC stored for a corresponding user request.

3. The method according to claim 1, wherein an RVC is generated for a user request by performing non-parameter hashing with respect to that user request, wherein said performance comprises storing parameters related to the user request and generating the RVC as a unique identifier associated with those stored parameters, and wherein verifying the integrity of a received request comprises verifying that parameters related to the received request are unmodified as compared to stored parameters associated with the RVC received together with the request.

4. The method according to claim 1, wherein an RVC is generated for a user request by performing parameter hashing with respect to that user request, wherein said performance comprises generating the RVC based on parameters related to the user request, and wherein verifying the integrity of a received request comprises generating an RVC based on parameters related to the received request and verifying the integrity of the received request if that generated RVC is equivalent to the RVC received together with the request.

5. The method according to claim 1, wherein verifying whether the privacy settings of a user allow a received request comprises verifying whether the privacy settings allow a particular user to have initiated the received request.

6. The method according to claim 1, wherein an RVC is generated for a user request by performing parameter hashing with respect to that user request, wherein said performance comprises generating the RVC based on parameters related to the user request.

7. The method according to claim 1, wherein an RVC is generated for a user request by performing non-parameter hashing with respect to that user request, wherein said performance comprises generating the RVC as a unique identifier that is independent of parameters related to the user request.

8. The method according to claim 1, wherein each of said requests sent from or received at the trusted subsystem relates to a request for location information of a user.

9. The method according to claim 1, wherein said verification is performed upon invocation by a Parlay-X Gateway in the trusted subsystem that receives each request from the SP.

10. The method according to claim 1, wherein a request received at the trusted subsystem includes a requestor parameter indicating the user who initiated the request and an address parameter indicating the user whose privacy settings are implicated by the request.

11. The method according to claim 1, wherein a user request comprises at least one of a Short Message Service (SMS) and a Multimedia Message Service (MMS) message.

12. The method according to claim 1, wherein a user request is to be sent from the trusted subsystem to an SP in the untrusted subsystem using Wireless Application Protocol (WAP) access.

13. The method according to claim 5, wherein a user request is intercepted by a SP WAP portal before being sent to the SP.

14. The method according to claim 5, wherein an RVC is generated for a user request responsive to determining that the user request implicates privacy settings of a user.

15. The method according to claim 1, wherein a user request is to be sent from the trusted subsystem to an SP in the untrusted subsystem using Web access.

16. The method according to claim 15, wherein a user request is intercepted by a SP WEB portal before being sent to the SP.

17. The method according to claim 15, wherein a user initiating the user request is required to login if the user request implicates privacy settings of another user, and wherein an RVC is generated responsive to verification of a user ID and password provided for said login.

18. A method implemented by a gateway for privacy control in a communication network, wherein the communication network includes a trusted subsystem and an untrusted subsystem, wherein the trusted subsystem includes the gateway and at least one privacy server and wherein the untrusted subsystem includes at least one Service Provider (SP), wherein the method comprises:
    receiving a request together with a Request Verification Code (RVC) from an SP in the untrusted subsystem, wherein the RVC has been generated by the at least one privacy server performing parameter hashing or non-Parameter-hashing with respect to that request, wherein parameter hashing is a hashing algorithm applied on at least one parameter included in the user request and wherein a non-parameter hashing is a hashing algorithm that utilizes a unique identifier independent of the user request; and
    invoking the at least one privacy server to verify the integrity of the received request based on the RVC and to verify whether privacy settings of a particular user allow the request.

19. The method according to claim 18, wherein the request requests information about said user, and wherein the method further comprises, if the integrity of the request is verified and the privacy settings of said user allow the request, obtaining the requested information and exposing that information to the SP in the untrusted subsystem.

20. The method according to claim 18, further comprising:
    intercepting a user request before that request is sent to an SP in the untrusted subsystem;
    requesting that the at least one privacy server generate and return an RVC for the intercepted user request; and
    forwarding the intercepted user request together with the returned RVC to the SP.

21. The method according to claim 18, wherein the gateway comprises a Parlay-X Gateway.

22. A privacy server for privacy control in a communication network, wherein the communication network includes a trusted subsystem and an untrusted subsystem, wherein the trusted subsystem includes the privacy server and the untrusted subsystem includes at least one Service Provider (SP), wherein the privacy server comprises a memory for storing computer instructions and means for executing the stored computer instructions to:
    generate a Request Verification Code (RVC) for each user request that is to be sent from the trusted subsystem to an SP in the untrusted subsystem, wherein an RVC is generated for a user request by performing parameter hashing or non-Parameter-hashing with respect to that user request and is to be sent to the SP along with the user request, wherein parameter hashing is a hashing algorithm applied on at least one parameter included in the user request and wherein a non-parameter hashing is a hashing algorithm that utilizes a unique identifier independent of the user request; and for each request that is received at the trusted subsystem from an SP in the untrusted subsystem and that implicates privacy settings of a user, verify the integrity of that received request based on an RVC received together with the request and verify whether the privacy settings of the user allow the request.

23. The privacy server according to claim 22, further configured to store the RVC generated for each user request and to verify the integrity of a received request by verifying that the RVC received together with that request is identical to the RVC stored for a corresponding user request.

24. The privacy server according to claim 22, configured to generate an RVC for a user request by performing non-parameter hashing with respect to that user request, wherein said performance comprises storing parameters related to the user request and generating the RVC as a unique identifier associated with those stored parameters, and wherein the privacy server is configured to verify the integrity of a received request by verifying that parameters related to the received request are unmodified as compared to stored parameters associated with the RVC received together with the request.

25. The privacy server according to claim 22, configured to generate an RVC for a user request by performing parameter hashing with respect to that user request, wherein said performance comprises generating the RVC based on parameters related to the user request, and wherein the privacy server is configured to verify the integrity of a received request by generating an RVC based on parameters related to the received request and verifying the integrity of the received request if that generated RVC is equivalent to the RVC received together with the request.

26. The privacy server according to claim 22, configured to verify whether the privacy settings of a user allow a received request by verifying whether the privacy settings allow a particular user to have initiated the received request.

27. The privacy server according to claim 22, configured to generate an RVC for a user request by performing parameter hashing with respect to that user request, wherein said performance comprises generating the RVC based on parameters related to the user request.

28. The privacy server according to claim 22, configured to generate an RVC for a user request by performing non-parameter hashing with respect to that user request, wherein said performance comprises generating the RVC as a unique identifier that is independent of parameters related to the user request.

29. The privacy server according to claim 22, wherein each of said requests sent from or received at the trusted subsystem relates to a request for location information of a user.

30. The privacy server according to claim 22, configured to perform said verification upon invocation by a Parlay-X Gateway in the trusted subsystem that receives each request from the SP.

31. The privacy server according to claim 22, wherein the privacy server is included in a mobile core network of a mobile operator domain.

32. The privacy server according to claim 22, wherein a user request comprises at least one of a Short Message Service (SMS) and a Multimedia Message Service (MMS) message.

33. The privacy server according to claim 22, wherein the SP includes an SP Web Portal associated with the privacy server, and wherein the privacy server is configured to require a user initiating a user request to login if that user request implicates privacy settings of another user, and to generate an RVC for the user request responsive to verification of a user ID and password provided for said login.

34. The privacy server according to claim 22, wherein the SP includes a SP Wireless Application Protocol (WAP) Portal associated with the privacy server, and wherein the privacy server is configured to generate an RVC for a user request responsive to determining that the user request implicates privacy settings of a user.

35. A gateway for privacy control in a communication network, wherein the communication network includes a trusted subsystem and an untrusted subsystem, wherein the trusted subsystem includes the gateway and at least one privacy server and wherein the untrusted subsystem includes at least one Service Provider (SP), wherein the gateway comprises a memory for storing computer instructions and means for executing the stored computer instructions to: receive a request together with a Request Verification Code (RVC) from an SP in the untrusted subsystem, wherein the RVC has been generated by the at least one privacy server performing parameter hashing or non-Parameter-hashing with respect to that request, wherein parameter hashing is a hashing algorithm applied on at least one parameter included in the user request and wherein a non-parameter hashing is a hashing algorithm that utilizes a unique identifier independent of the user request; and invoke the at least one privacy server to verify the integrity of the received request based on the RVC and to verify whether privacy settings of a particular user allow the request.

36. The gateway according to claim 35, wherein the request requests information about said user, and wherein the gateway is further configured, if the integrity of the request is verified and the privacy settings of said user allow the request, to obtain the requested information and expose that information to the SP in the untrusted subsystem.

37. The gateway according to claim 35, wherein the gateway is further configured to:
intercept a user request before that request is sent to an SP in the untrusted subsystem;
request that the at least one privacy server generate and return an RVC for the intercepted user request; and
forward the intercepted user request together with the returned RVC to the SP.

38. The gateway according to claim 35, wherein the gateway comprises a Parlay-X Gateway.

39. The gateway according to claim 35, wherein the gateway is included in a mobile core network of a mobile operator domain.

40. A computer program product stored on a non-transitory computer-readable medium and comprising computer program instructions that, when executed by a privacy server, cause the privacy server to implement privacy control in a communication network, wherein the communication network includes a trusted subsystem and an untrusted subsystem, wherein the trusted subsystem includes the at least one privacy server and the untrusted subsystem includes at least one Service Provider (SP), wherein the computer program instructions cause the privacy server to: generate a Request Verification Code (RVC) for each user request that is to be sent from the trusted subsystem to an SP in the untrusted subsystem, wherein an RVC is generated for a user request by performing parameter hashing or non-Parameter-hashing with respect to that user request and is to be sent to the SP along with the user request, wherein parameter hashing is a hashing algorithm applied on at least one parameter included in the user request and wherein a non-parameter hashing is a hashing algorithm that utilizes a unique identifier independent of the user request; and for each request that is received at the trusted subsystem from an SP in the untrusted subsystem and that implicates privacy settings of a user, verify the integrity of that received request based on an RVC received together with the request and verify whether the privacy settings of the user allow the request.

41. A computer program product stored on a non-transitory computer-readable medium and comprising computer program instructions that, when executed by a gateway, cause the gateway to implement privacy control in a communication network, wherein the communication network includes a trusted subsystem and an untrusted subsystem, wherein the trusted subsystem includes the gateway and at least one privacy server and wherein the untrusted subsystem includes at least one Service Provider (SP), wherein the gateway is configured to receive a request together with a Request Verification Code (RVC) from an SP in the untrusted subsystem, wherein the RVC has been generated by the at least one privacy server performing parameter hashing or non-Parameter-hashing with respect to that request, wherein parameter hashing is a hashing algorithm applied on at least one parameter included in the user request and a non-parameter hashing is a hashing algorithm that utilizes a unique identifier independent of the user request, and wherein the computer program instructions cause the gateway to invoke the at least one privacy server to verify the integrity of the received request based on the RVC and to verify whether privacy settings of a particular user allow the request.

* * * * *

UNITED STATES PATENT AND TRADEMARK OFFICE
CERTIFICATE OF CORRECTION

PATENT NO. : 8,881,241 B2  
APPLICATION NO. : 13/148223  
DATED : November 4, 2014  
INVENTOR(S) : Zhang et al.

Page 1 of 1

It is certified that error appears in the above-identified patent and that said Letters Patent is hereby corrected as shown below:

On the title page, item 75, under "Inventors", in Column 1, Line 1, delete "Guangodng" and insert -- Guangdong --, therefor.

In the drawings

Figure 4:
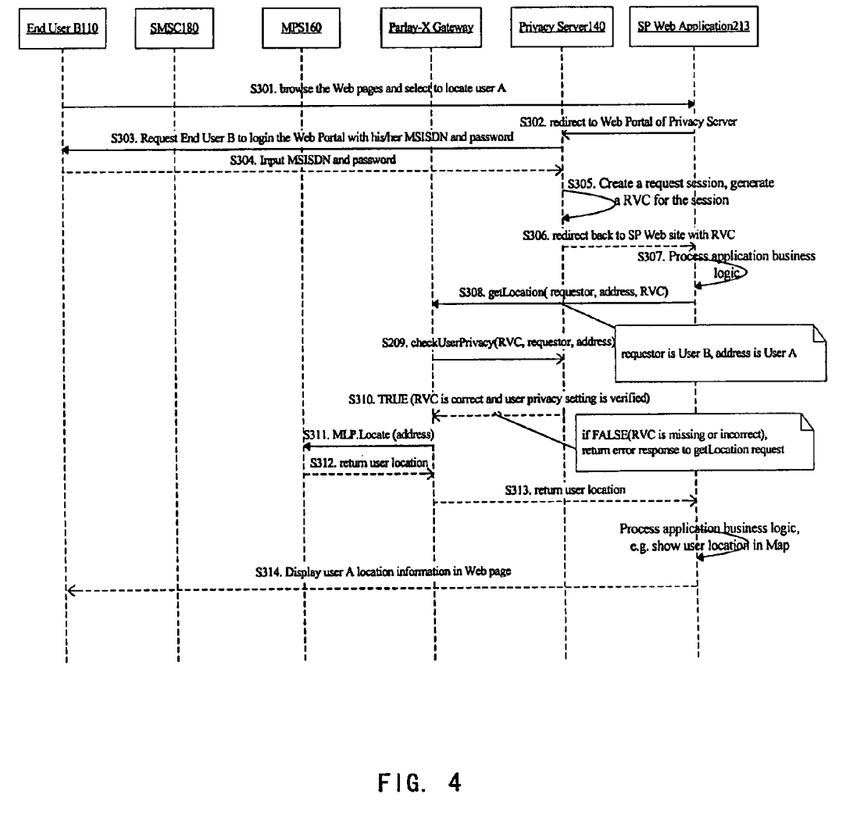
FIG. 4 represents an exemplary message flow that illustrates an embodiment having implemented privacy control in a scenario with Web access.

In Fig. 4, Sheet 4 of 4, delete "Parlay-X Gateway" and insert -- Parlay-X Gateway 120 --, therefor.

In the specification

In Column 3, Lines 30-31, delete "Positioning (MPS)" and insert -- Positioning System (MPS) --, therefor.

In Column 6, Line 64, delete "46193579 H." and insert -- 46193579". --, therefor.

In Column 7, Line 1, delete ""SMPPH" and insert -- "SMPP" --, therefor.

In Column 7, Line 3, delete "MM7" and insert -- MMS --, therefor.

In Column 7, Line 5, delete "SM8" and insert -- SMS --, therefor.

In Column 7, Line 6, delete "8M8" and insert -- SMS --, therefor.

In Column 9, Lines 56-57, delete "invention," and insert -- invention --, therefor.

In Column 10, Line 52, delete "(MSISON)" and insert -- (MSISDN) --, therefor.

In the claims

In Column 13, Line 5, in Claim 13, delete "claim 5," and insert -- claim 12, --, therefor.

In Column 13, Line 8, in Claim 14, delete "claim 5," and insert -- claim 12, --, therefor.

Signed and Sealed this  
Thirteenth Day of October, 2015

Michelle K. Lee  
*Director of the United States Patent and Trademark Office*